3,845,159
TETRAPOLYMER OF ETHYLENE/$C_3$-$C_{12}$ ALPHA-MONOOLEFIN/MALEIC ANHYDRIDE/$C_6$-$C_{22}$ NONCONJUGATED DIENE
Tsuneichi Takeshita, Newark, Del., assignor to E. I. du Pont de Nemours and Company, Wilmington, Del.
No Drawing. Original application Apr. 15, 1971, Ser. No. 134,448, now abandoned. Divided and this application Mar. 29, 1973, Ser. No. 346,162
Int. Cl. C08f 1/56, 15/40
U.S. Cl. 260—785 BB
8 Claims

ABSTRACT OF THE DISCLOSURE

A coordination catalyst exhibiting high efficiency and comprising a hydrocarbon soluble vanadium compound, an organoaluminum dihalide or a mixture thereof with an organoaluminum monohalide, and an anhydride of the formula

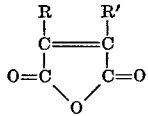

wherein R and R' are H, halogen, haloalkyl, carbalkoxy, benzo, keto, or aryl; the aluminum to vanadium atomic ratio being about (5–200):1, and the ratio of moles of the organoaluminum dihalide to moles of anhydride being about 1:(0.1–1).

Also provided are novel tetrapolymers of ethylene/a higher alpha-monoolefin/maleic anhydride/a non-conjugated diene containing only one readily polymerizable double bond. Such tetrapolymers exhibit improved flow properties at elevated temperatures and increased green strength at low temperatures as compared to conventional EPDM type terpolymers.

This is a division of application Ser. No. 134,448, filed Apr. 15, 1971, now abandoned.

BACKGROUND OF THE INVENTION

A wide variety of vanadium based catalysts are known to be useful for the production of elastomeric, sulfur-curable copolymers of ethylene, a $C_3$-$C_{12}$ alpha-mono-olefin and a $C_6$-$C_{22}$ non-conjugated diene having only one readily polymerizable double bond. However, such prior art catalysts are generally deficient in that (a) they exhibit low catalyst efficiency and (b) catalytic activity generally decreases rapidly during the course of the polymerization.

THE INVENTION

In accordance with this invention there is provided a coordination catalyst consisting essentially of (a) a hydrocarbon soluble vanadium compound, (b) an organoaluminum dihalide or a mixture thereof with an organoaluminum monohalide and (c) an anhydride of the formula

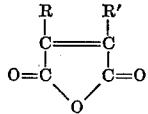

wherein R and R' are H, halogen, haloalkyl, carbalkoxy, benzo, keto, or aryl; the aluminum to vanadium atomic ratio being about (5–200):1 and the ratio of moles of the organoaluminum dihalide to moles of anhydride being about 1:(0.1–1).

The catalyst of this invention exhibits high catalytic efficiency, produces ter- and tetrapolymers without undesirable homopolymer formation and results in a reaction mass which remains free from undesirable solids deposition.

Catalytic efficiency is defined as grams of polymer produced per gram-atom of vanadium.

Also provided in accordance with this invention are novel tetrapolymers of ethylene/a $C_3$-$C_{12}$ alpha-monoolefin/maleic anhydride/and a $C_6$-$C_{22}$ non-conjugated diene having only one polymerizable double bond. Such tetrapolymers exhibit improved flow properties at elevated temperatures as compared to conventional EPDM type polymers. The rheological properties of such tetrapolymers result in enhanced suitability for injection molding applications. Such tetrapolymers are prepared in accordance with this invention when the maleic anhydride component of the catalyst hereinbefore described has hydrogen substituted alpha,beta-carbon atoms, When the anhydrides of the catalyst of this invention having substituents other than H on the alpha,beta-carbon atoms are employed in the catalyst, these novel tetrapolymers are not formed; the product being the terpolymers hereinbefore described. Blends of the novel tetrapolymer with conventional terpolymers are also useful; the blends exhibiting improved properties similar to those described above.

The novel catalyst system of this invention is useful for making homogeneous elastomeric sulfur-curable EODM, i.e., a polymer of ethylene/a $C_3$-$C_{12}$ alpha-monoolefin/a $C_6$-$C_{22}$ non-conjugated diene, polymers in which the alpha-monoolefin is, for example, propylene, 1-butene, 1-pentene, 1-hexene, 1-heptene, 1-octene, 1-nonene, 1-decene, 1-undecene, 1-dodecene and the non-conjugated diene is, for example, 1,4-hexadiene, 2-methyl-1,5-hexadiene, 1,6-octadiene, 1,8-decadiene, 1,18-eisocadiene, 1,9-octadecadiene, 6-methyl-1,5-heptadiene, 7-methyl-1,6-octadiene, 11-ethyl-1,11-tridecadiene, 5-ethylidene-2-norbornene, 5-(2'-butenyl)-2-norbornene, dicyclopentadiene, and 5-methylene-2-norbornene.

The novel catalytic compositions of this invention are particularly useful for making homogeneous elastomeric sulfur-curable copolymers containing about 15–80 weight percent (preferably about 25–60 weight percent) of a $C_3$-$C_{12}$ alpha-monoolefin unit (preferably propylene), about 20–75 weight percent (preferably about 40–75 weight percent) of ethylene units, and about 1–20 weight percent (preferably about 2–10 weight percent) units of a non-conjugated diene having only one polymerizable double bond.

Any of the vanadium compounds known to the art to be useful as components of coordination catalysts for polymerizing alpha-olefins are useful in the catalysts of the present invention. These include vanadium halides, vanadium oxyhalides, addition complexes of vanadium halides with oxygen- and nitrogen-containing ligands, chelate complexes of vanadium with 1,3-diketone compounds and compounds such as alkyl vanadate esters. Suitable vanadium compounds include, for example, $VCl_4$, $VOCl_3$, vanadium tris(acetylacetonate), vanadium oxybis(acetylacetonate), trimethyl vanadate, triisopropyl vanadate O = V[O—CH(CH$_3$)$_2$]$_3$, tetrakis(beta-ethoxyethoxy)vanadium, triallyl vanadate O = V(O—CH$_2$CH = CH$_2$)$_3$, tri-n-octadecyl vanadate, tetrahydrofuranate of $VCl_3$, bis(gamma-isopropoxy)vanadium dibromide, beta-ethoxyethoxy vanadium trichloride, 2,2-dimethyl-1,3-propylenedioxy vanadyl fluoride, fluorovanadyl bis(acetylacetonate), diethoxy vanadyl fluoride, vanadium tris(theonyl trifluoroacetonate), vanadium tris(trifluoroacetyl acetonate), pyridinate of $VCl_3$, trimethylaminate of $VCl_3$, tris(2-ethyl hexyl) vanadate, $VI_4$, $VBr_4$, $VOBr_3$, $VOI_3$ and dibromo vanadyl acetylacetonate. Preferred vanadium components for the catalyst are $VCl_4$, $VOCl_3$ and vanadium triacetylacetonate.

Organoaluminum halides useful as components of the catalysts are organoaluminum dihalides and their mixtures with each other and with diorganoaluminum monohalides (as in sesquihalides). The relative proportions of dihalide and monohalide are not critical as long as there is sufficient dihalide present to keep the maleic anhydride from deactivating the vanadium catalyst, i.e., at least about 1 mole dihalide per mole anhydride. Generally such mixtures should contain at least about 0.1 mole dihalide per mole monohalide. The amount of monohalide employed is not critical. Sesquihalides are conveniently employed. At higher reaction temperatures it will be found advantageous to employ higher proportions of the dihalide. Although dihalides can be used alone, it is sometimes advantageous—as when 1,4-hexadiene is employed as one of the polymerization monomers—to have some monohalide present.

Alkylaluminum dihalides are particularly preferred, especially when present as part of a sesquihalide mixture. Preferred alkyl groups have 1 to 8 carbon atoms. The aryl aluminum dihalides and sesquihalides are also useful.

When a sesquihalide is employed as the organoaluminum halide component of the catalyst of this invention, it should be considered to be an equimolar mixture of organoaluminum dihalide and diorganoaluminum monohalide for purposes of calculating the dihalide/anhydride ratio.

The chlorides are the preferred halides, but bromides and iodides can also be used; fluorides can be employed when another halide is present.

Suitable aluminum compounds include ethylaluminum dichloride, ethylaluminum dibromide, isobutylaluminum dichloride, n-dodecylaluminum dichloride, hexylaluminum diiodide, octadecylaluminum dichloride, phenylaluminum dichloride, butylaluminum sesquichloride, and phenylaluminum sesquiiodide. Monohalides which can be used in admixture with the dihalides include dimethyl aluminum chloride, diethylaluminum chloride, diisobutylaluminum chloride, di-n-hexylaluminum chloride, decylethylaluminum chloride, dimethylaluminum bromide, diethylaluminum bromide, isoamyldodecylaluminum iodide, dibutylaluminum fluoride, diphenylaluminum chloride, diethylaluminum fluoride, and dioctadecylaluminum chloride.

Anhydrides which are useful in the catalysts of the present invention include those of the formula

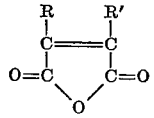

wherein R and R' are independently H; halogen, preferably chloride; carbalkoxy, preferably of about 2-20 carbon atoms; benzo, including halo substituted benzo; keto, preferably of about 2-20 carbon atoms or aryl.

Typical anhydrides which are useful include maleic anhydride, monochloromaleic anhydride, monofluoromaleic anhydride, monobromomaleic anhydride, dichloromaleic anhydride, dibromomaleic anhydride, tetrachlorophthalic anhydride, and trichloromethylmaleic anhydride. Preferred anhydrides include maleic anhydride; monochloromaleic anhydride, dichloromaleic anhydride, trichloromethylmaleic anhydride, and tetrachlorophthalic anhydride.

As indicated hereinbefore, when maleic anhydride is employed, it is incorporated into the polymerization and a desirable tetrapolymer is formed.

It is immaterial whether these catalysts are used in solution or dispersion polymerizations. Batch or continuous processes can be used. Usually, for convenience and in order to prevent possible undesirable side reactions, the catalyst components are added separately in the form of solutions to the polymerization medium, although the vanadium and organoaluminum components can be admixed prior to use if desired. These procedures are known to the art.

The ratio of moles of organoaluminum dihalide to moles of anhydride present in the catalyst is critical since catalytic efficiency falls off rapidly when the ratio is less than about 1. The preferred ratio of these catalyst components employed to achieve maximum catalytic efficiency is about (1-1.5):1, especially about (1-1.25:1).

EXAMPLE 1

(A) Use of maleic anhydride based catalyst to give E/P/1,4-HD/MA tetrapolymer

The atmospheric pressure, continuous glass reactor employed, having a 500 milliliter capacity, is provided with a gas inlet for ethylene and propylene, separate inlets for charging liquids (hexane, 1,4-hexadiene, a solution of $VOCl_3$, a solution of ethylaluminum sesquichloride, and a solution of maleic anhydride), an outlet for reactor liquid effluent, a thermometer, a mechanical stirrer, and a water-cooled jacket for temperature control. This reactor is sparged with dry nitrogen before anything is added. Initially, steady-state olefin copolymerization conditions are established using conventional methods; no maleic anhydride being employed:

Reactor conditions:
  Residence time _____ ~30 minutes.
  Temperature _____ 20° C.
  Pressure _____ Atmospheric.
Flow rates for reactor feed streams:
  Ethylene _____ 1 liter/min.
  Propylene _____ 2 liters/min.
  1,4-hexadiene _____ 0.049 g.-mol/hr.
  $Et_{1.5}AlCl_{1.5}$ (in hexane) ____ 0.0177 g.-mol/hr.
  $VOCl_3$ (in hexane) _____ 0.0001138 g.-mol/hr.
  Total hexane _____ 1 liter/hr.

Coordination catalyst is formed *in situ* in the reactor to give a colorless solution in which the Al:V atomic ratio is about 156:1.

Polymer is isolated by the following procedure. Initially, residual active catalyst in the reactor effluent is quenched by treatment with isopropanol (containing a phenolic antioxidant such as 4,4'-thiobis(3-methyl-6-tert-butylphenol)). After the effluent has then been washed thoroughly with 1-3% hydrochloric acid and three subsequent water washes, ethylene/propylene/1,4-hexadiene tripolymer is isolated by steam stripping, followed by drying in a vacuum oven. Typically, about 71,000 grams of polymer product are obtained for each gram-atom of vanadium, i.e., about 8.1 grams of polymer per hour of reactor operation.

After the conventional run has continued for six hours, conditions corresponding to the present invention are established by continuously introducing 15.5 ml. per hour of a 0.523 molar benzene solution of maleic anhydride (0.00811 g.-mol/hr.). As soon as this solution enters the reactor, a yellow color appears, more heat is generated, and the viscosity rises. Typically, about 360,000 grams of polymer (a blend of ethylene/propylene/1,4-hexadiene/maleic anhydride tetrapolymer and ethylene/propylene/1,4-hexadiene tripolymer) are obtained for each gram-atom of vanadium, i.e., about 41 grams of polymer per hour of reactor operation.

It is clear from the data tabulated in Tables I and II below that the addition of maleic anhydride causes: (1) increased vanadium efficiency; (2) incorporation of maleic anhydride into the copolymer product as revealed by the oxygen content, the ash content (resulting from aluminum carboxylate salt groups in the tetrapolymer), and anhydride, carboxyl and carboxylate bands ($5.6\mu$, $5.8\mu$, $6.3\mu$) in the infrared absorption spectrum of the polymer film.

TABLE I.—INCREASE IN VANADIUM EFFICIENCY CAUSED BY MALEIC ANHYDRIDE ADDITION

| Sample No. | Sample time, hrs.[1] | Molar feed ratios, $Et_{1.5}AlCl_{1.5}$/MA/$VOCl_3$ | Vanadium efficiency (g. polymer/g.-atom of V) |
|---|---|---|---|
| 1[2] | 3 | 156/0/1 | 66,500 |
| 2[2] | 4 | 156/0/1 | 75,000 |
| 3[2] | 5 | 156/0/1 | 66,500 |
| 4[2] | 6 | 156/0/1 | 76,000 |
| | 6 | [MA add'n begun] | |
| 5 | 8 | 156/71/1 | 400,000 |
| 6 | 9 | 156/71/1 | 320,000 |
| 7 | 10 | 156/71/1 | 355,000 |

[1] Hours after reactor start-up.
[2] Outside scope of present invention; for comparison only.

NOTE.—MA=Maleic anydride.

TABLE II.—EFFECT OF PRODUCT COMPOSITION CAUSED BY MALEIC ANHYDRIDE ADDITION

| Sample No. | $\eta$ inh.[1] | Br. No. (mols/kg.) | Weight percent Oxygen[2] | Al | Ash | $\overset{O}{\underset{\parallel}{C}}$ IR band |
|---|---|---|---|---|---|---|
| 1–4[3] | 1.47 | 0.44 | 0 | 0 | 0.06 | Absent. |
| 5 | 1.40 | 0.27 | 2.14 | 0.28 | 0.69 | Present. |
| 6 | 1.31 | 0.19 | 2.22 | 0.26 | 0.87 | Do. |
| 7 | 1.44 | 0.27 | 2.24 | 0.17 | 0.45 | Do. |

[1] 01. g./100 ml. of perchloroethylene at 30° C.
[2] Max. percent oxygen as Al carboxylate is 2.5%.
[3] Outside scope of present invention; for comparison only.

(B) Control using succinic anhydride

For purpose of comparison, an experiment is run outside the scope of the present invention. Succinic anhydride (the saturated derivative of maleic anhydride) is substituted for maleic anhydride in the procedure of part (A). Typically, the resulting catalyst has an efficiency of only about 83,000 grams of ethylene/propylene/1,4-hexadiene tripolymer per gram-atom of vanadium, a value substantially the same as that of the V/AL catalyst system in the absence of a promoter.

EXAMPLE 2

Use of a dichloromaleic anhydride based catalyst

When the dichloromaleic anhydride ("DCMA") is substituted for maleic anhydride in the procedure of Example 1, keeping the molar ratio of Al/DCMA/V=156/71/1, the resulting catalyst typically displays an efficiency of 750,000 grams of E/P/1,4-hexadiene tripolymer product per gram-atom of vanadium, i.e., about 85.5 grams of polymer per hour of reactor operation. When the catalyst proportions are altered, giving a molar ratio of Al/DCMA/V=35/18/1, the efficiency is typically 400,000.

The polymer product produced with the dichloromaleic anhydride catalyst is EPDM terpolymer.

EXAMPLE 3

Use of a tetrachlorophthalic anhydride base catalyst

Tetrachlorophthalic anhydride ("TCPA"), a tetrachlorobenzo derivative of maleic anhydride, is substituted for maleic anhydride in the general procedure of Example 1; the proportions of catalyst components are altered.

The molar ratio of $Et_{1.5}AlCl_{1.5}$/TCPA/$VOCl_3$=70/18/1. Typically, the resulting catalyst has an efficiency of 220,000 grams of ethylene/propylene/1,4-hexadiene per gram-atom of vanadium corresponding to 25.1 grams of polymer per hour of reactor operation. The polymer product is EPDM terpolymer.

EXAMPLE 4

(A) Preparation of E/P/HD tripolymer/E/P/HD/MA tetrapolymer blend in a continuous pressure reactor In the preceding Examples 1 to 3, atmospheric pressure reactor is used. Example 4 is conducted at superatmospheric pressure. The greater pressure causes an advantageous increase in the molecular weight of the polymer product. As is observed when ethylene, propylene, and 1,4-hexadiene are copolymerized, the copolymer molecular weight depends on the olefin mol fraction in the system (or the pressure).

A two-liter continuous autoclave is employed having an inside diameter of 10.16 centimeters and equipped with an agitator having a tip-to-tip blade diameter of 6.35 centimeters; this autoclave contains suitable inlet ports for monomers, solvent, and catalyst components and exit ports for reactor off-gas and liquid overflow; conventional means for monitoring temperature and pressure are present. Before anything is added, the autoclave is sparged with dry nitrogen.

During operation the reactor contains a liquid phase and a gas phase. Ethylene and propylene are added as gases; all other components are introduced as liquids or as solutions.

The following conditions are maintained:

Autoclave conditions:
    Temperature _____ 35° C.
    Pressure _____ 7.01 kg./cm.² (absolute).
    Residence time _____ 24.3 min.
Flow rates for autoclave feed streams:
    Ethylene _____ 141 grams/hr.
    Propylene _____ 336 grams/hr.
    1,4-hexadiene _____ 50 grams/hr.
    Maleic anhydride [a] ____ 3.40 grams/hr.
    $Et_{1.5}AlCl_{1.5}$ [b] _____ 0.069 gram-mol/hr.
    $VOCl_3$ [b] _____ 0.000444 gram-mol/hr.
    Total hexane _____ 1.6 liters/hr.

[a] In benzene (0.41 molar).
[b] In hexane.

The coordination catalyst is formed *in situ*. Its components are present in the following proportions:

MA (gram-mols):Al (gram-atoms):V (gram-atoms) =78.2:156:1
MA/Al=0.5.

The product is isolated by the procedure described in Example 1 at the rate of about 193 grams per hour corresponding to a catalyst efficiency of about 435,000 (grams of polymer/gram-atom of vanadium).

Typical analyses indicate the following properties for the whole polymer:

Inherent viscosity _____ 1.91.
Wallace plasticity
  (at 100° C.) _____ 24.
Ash content _____ 0.6 wt. percent.
Unsaturation _____ 0.34 gram-mol of ethylenic groups per kilogram.

Composition:
    Propylene _____ 34.4 wt. percent.
    Maleic anhydride _____ 1.5 wt. percent.
    1,4-hexadiene _____ 3.7 wt. percent.
    Ethylene _____ 60.4 wt. percent.

If 5-gram portions of whole polymers, made and isolated by procedures similar to the one above, are allowed to stand at room temperature without agitation in 300 milliliters of hexane, about 15 to 40% of a typical sample remains insoluble. Substantially all the maleic anhydride incorporated into the polymer is found in the hexane insoluble fraction. When the whole polymer is fractionated by molecular weight, each fraction contains polymer with incorporated maleic anhydride. The copolymerization process given above thus prepares a blend consisting essentially of about 60 to 85 weight percent E/P/1,4-hexadiene tripolymer and about 15 to 40 weight percent E/P/1,4-hexadiene/maleic anhydride tetrapolymer.

On account of the presence of the maleic anhydride tetrapolymer, the whole polymer produced by this example shows rheological properties different from those of a linear all-hydrocarbon polymer such as an EPDM tripolymer. The subject maleic anhydride tetrapolymers themselves and their blends with linear EPDM elastomers of corresponding viscosity-average molecular weight exhibit improved green strength at low temperatures and improved flow properties at high temperatures as compared to conventional EPDM elastomers.

The Mooney viscosity is a characteristic measure of polymer bulk viscosity. Table III below shows how the values for the whole polymer product of this example (and a conventional tripolymer control) change as temperature increases.

TABLE III.—CHANGE OF BULK VISCOSITY WITH TEMPERATURE

|  | $\eta$ inh. | Mooney viscosity | | |
|---|---|---|---|---|
|  |  | ML-1+ 10/66° C. | ML-1+ 10/121° C. | ML-1+ 10/177° C. |
| Whole polymer (containing E/P/HD/ MA plus E/P/HD) | 1.91 | 147 | 62.5 | 9 |
| E/P/HD control | 2.33 | 85 | 44.5 | 17.9 |

EXAMPLE 5

Effect of maleic anhydride/Al ratio on catalyst efficiency

Three runs A, B, and C are made in the apparatus described in Example 4 above in order to observe the effect of the organoaluminum dihalide/anhydride ratio on the catalyst efficiency. Operating details are as follows:

|  | A | B | C |
|---|---|---|---|
| Reactor conditions: |  |  |  |
| Residence time (min.) | ~23 | 24 | 23.0 |
| Temperature (° C.) | 35 | 35 | 35 |
| Pressure (kg./cm.²) | 7.01 | 7.01 | 7.29 |
| Feed rates: |  |  |  |
| Ethylene gas (grams/hr.) | 153 | 140 | 59 |
| Propylene gas (grams/hr.) | 424.5 | 336 | 424.5 |
| 1,4-hexadiene (grams/hr.) | 50 | 49 | 50 |
| Maleic anhydride (grams/hr.)[1] | 3.17 | 3.40 | 5.19 |
| Et$_{1.5}$AlCl$_{1.5}$ (gram-mols/hr.)[2] | 0.080 | 0.069 | 0.080 |
| VOCl$_3$ (gram-mols/hr.)[2] | 0.00059 | 0.000444 | 0.00059 |
| Total hexane (liters/hr.) | 1.6 | 1.6 | 1.6 |
| Catalyst proportions: |  |  |  |
| Al(gram-atom):V (gram-atom) | 135 | 155 | 135 |
| MA (gram-mol):V (gram-atom) | 55 | 78 | 90 |
| Al (gram-atom):MA (gram-mol) | 2.47 | 1.99 | 1.51 |
| Ethyl aluminum dichloride (gram-mol):MA (gram-mol) | 1.23 | 1.0 | .75 |
| Production rate (grams/hr.) | 239 | 187 | 17 |
| V efficiency (grams polymer/gram atom V) | 450,000 | 421,000 | 28,800 |
| Properties of rewashed whole polymer: |  |  |  |
| Inherent viscosity | 1.80 | 2.23 | 1.48 |
| Wallace plasticity (at 100° C.) | 22 | 39 | 18 |
| Percent ash | 0.3 | 0.1 | 0.1 |
| Wt. percent: |  |  |  |
| E | 50.1 | 60.3 | [3] 63.2 |
| P | 44.0 | 34.0 | 30.2 |
| 1,4-HD | 4.1 | 4.0 | 4.9 |
| MA | 1.8 | 1.7 | [3] 1.7 |
| Gram-mol ethylenic groups per kilogram of polymer | 0.34 | 0.29 | [3] 0.36 |

[1] In benzene solution (0.41 molar).
[2] In hexane solution.
[3] Estimated.

What is claimed is:

1. An elastomeric sulfur-curable tetrapolymer of about 20-75 weight percent of ethylene units, about 15-80 weight percent of C$_3$-C$_{12}$ alpha-monoolefin units, about 1-20 weight percent of units of a C$_6$-C$_{22}$ nonconjugated diene having only one polymerizable double bond, the balance being maleic anhydride units, said tetrapolymer exhibiting in the infrared absorption spectrum anhydride, carboxyl and carboxylate bands at 5.6μ, 5.8μ, and 6.3μ, respectively.

2. The tetrapolymer of claim 1 wherein the alpha-monoolefin is propylene and the diene is 1,4-hexadiene.

3. A process for the production of the tetrapolymers of claim 1 which consists essentially of contacting the ethylene/alpha-monoolefin/and diene monomers in the presence of a catalyst of (a) a hydrocarbon soluble vanadium compound, (b) an organoaluminum halide, which is a dihalide, a mixture of dihalides, or a mixture of dihalide and monohalide, and (c) maleic anhydride (C$_4$H$_2$O$_3$); the aluminum to vanadium atomic ratio being about 5-200:1 and the ratio of moles of organoaluminum dihalide to moles of anhydride being about 1:(0.1-1).

4. The process of claim 3 wherein the dihalide/anhydride ratio is about (1-1.5):1.

5. The process of claim 4 wherein the dihalide/anhydride ratio is about (1-1.25):1.

6. In a process for making elastomeric sulfur-curable copolymers of ethylene, a C$_3$-C$_2$ alpha-monoolefin and a C$_6$-C$_{22}$ nonconjugated diene having only one polymerizable double bond by contacting the monomers in the presence of a catalyst; the improvement which comprises using a coordination catalyst consisting essentially of (a) a hydrocarbon soluble vanadium compound, (b) an organoaluminum halide which is a dihalide, a mixture of dihalides, or a mixture of dihalide and monohalide, and (c) an anhydride of the formula

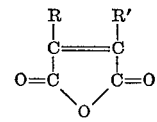

wherein R and R' are hydrogen, halogen, haloalkyl, carbalkoxy, benzo, keto, or aryl; the aluminum to vanadium atomic ratio being about 5-200:1 and the ratio of moles of organoaluminum dihalide to moles of anhydride being about 1:(0.1-1).

7. A vulcanizate of the tetrapolymer of claim 1.

8. An elastomeric sulfur-curable tetrapolymer of about 40-75 weight percent of ethylene units, about 25-60 weight percent of C$_3$-C$_{12}$ alpha-monoolefin units, about 2-10 weight percent of units of a C$_6$-C$_{22}$ nonconjugated diene having only one polymerizable double bond, the balance being maleic anhydride units, said tetrapolymer exhibiting in the infrared absorption spectrum anhydride, carboxyl and carboxylate bands at 5.6μ, 5.8μ, and 6.3μ, respectively.

References Cited

UNITED STATES PATENTS

| 3,301,834 | 1/1967 | Christman | 260—80.5 |
| 3,278,495 | 10/1966 | Hagel et al. | 260—78.5 |
| 3,060,155 | 10/1962 | Reinhard | 260—78.5 |
| 3,468,856 | 9/1969 | Asai et al. | 260—80.3 |
| 3,442,872 | 5/1969 | Korbanka | 260—78.5 |
| 2,396,785 | 3/1946 | Hanford | 260—78 |

FOREIGN PATENTS 1,128,090  9/1968  Great Britain.

JOSEPH L. SCHOFER, Primary Examiner

J. KIGHT III, Assistant Examiner

U.S. Cl. X.R.

252—434, 464; 260—79.5 P, 878 R